United States Patent [19]
Krul et al.

[11] Patent Number: 6,033,450
[45] Date of Patent: Mar. 7, 2000

[54] DEOILER SHAFT VORTEX SEPARATOR

[75] Inventors: Allan D. Krul, Jupiter; J. Wesley Harris, Jr., West Palm Beach, both of Fla.

[73] Assignee: United Technologies Corporation, Hartford, Conn.

[21] Appl. No.: 08/576,735

[22] Filed: Dec. 21, 1995

[51] Int. Cl.[7] .................................................. B01D 45/12
[52] U.S. Cl. ............................. 55/345; 55/409; 55/413; 55/438; 96/190
[58] Field of Search .............................. 55/414, 409, 413, 55/410, 345, 438; 96/190

[56] References Cited

U.S. PATENT DOCUMENTS

| | | | |
|---|---|---|---|
| 4,050,913 | 9/1977 | Roach | 55/414 |
| 4,200,599 | 4/1980 | Goettl | 261/97 |
| 4,344,844 | 8/1982 | Townley | 209/168 |
| 4,531,358 | 7/1985 | Smith | 60/39.08 |
| 5,209,765 | 5/1993 | Kolpak et al. | 55/168 |
| 5,322,551 | 6/1994 | Payne | 96/189 |

*Primary Examiner*—Jay H. Woo
*Assistant Examiner*—Iurie A. Schwartz

[57] ABSTRACT

The pressure drop through a passageway that flows a compressible fluid that flows axially with a vortex component is reduced by dividing the passageway into smaller parallel passageways. The vortex separator is combined with a deoiler that includes a rotatable inducer and porous media disk(s) in a lubrication system for removing the oil from the air where the oil is contaminated in the bearing compartments and gear boxes of a gas turbine engine.

10 Claims, 3 Drawing Sheets

DEOILER SHAFT VORTEX SEPARATOR

This invention was made under a United States Government contract and the Government has an interest herein.

CROSS REFERENCES

The subject matter of this invention relates to the subject matter disclosed in the contemporaneously filed patent application entitled "MULTI-STAGE DEOILER WITH POROUS MEDIA" Ser. No. 08/576,669, filed Dec. 21, 1995 by Allan D. Krul and Rodney L. Giersdorf and commonly assigned to United Technologies Corporation.

TECHNICAL FIELD

This invention relates to deoilers for gas turbine engines and particularly to means for lowering the pressure losses by baffling the discharged air component of the separated air/oil mixture.

BACKGROUND ART

It is well known that the deoilers used to separate the air that is entrained in the oil in the bearing compartments and gear boxes of a gas turbine engine, must be designed with a minimal amount of pressure drop. Any back pressure developed by the deoilers causes a pressure build-up in the bearing compartment which could, if left unattended, cause the oil to escape from the compartment.

U.S. Pat. No. 5,114,446 granted to Giersdorf et al on May 19, 1992 entitled "Deoiler for Jet Engine" which includes Allan D. Krul as a joint inventor who is common to the present patent application and which is commonly assigned to United Technologies Corporation discloses a deoiler that includes a high speed rotating hollow shaft that transfer the separated air to the breather valve prior to being vented overboard. The problem inherent in this system is that the vortex flow in the high speed hollow shaft results in a pressure loss that manifests a back pressure that ideally should be eliminated.

This invention includes a baffle adapted to be fitted into the hollow shaft so as to minimize the pressure loss and hence reduce the back pressure that would otherwise be felt by the bearing compartment.

SUMMARY OF THE INVENTION

An object of this invention is to provide means for lowering the pressure losses incidental to the effluent air discharging from an air/oil deoiler.

Another object of this invention is to provide a baffle for the hollow shaft of a deoiler mounted in the gear box of a gas turbine engine that is in communication with the engine's breather valve.

A still further object of this invention is to provide in combination a deoiler having a rotatable inducer and porous media disk(s) in combination with the baffle for providing a efficacious oil removal system with a minimal pressure loss.

A feature of this invention is the baffle insert in the hollow shaft of a deoiler that is characterized as being simple and inexpensive and having a efficient capacity to eliminate pressure losses from a vortical stream.

Another feature of this invention is the judicious location and geometry of the flow path and the discrete oil discharge holes for optimum oil removal.

The foregoing and other features of the present invention will become more apparent from the following description and accompanying drawings.

DETAILED DESCRIPTION OF THE PREFERRED EMBODIMENT

While this invention is disclosed in its preferred embodiment for separating the oil from an oil/air mixture in a lubrication system for a gas turbine engine that utilizes a hollow shaft for imparting rotation to an inducer and porous media disk(s), as one skilled in this art will appreciate this invention can be utilized for separation of a fluid mixture for other embodiments that include a hollow shaft as described.

Figure 1:
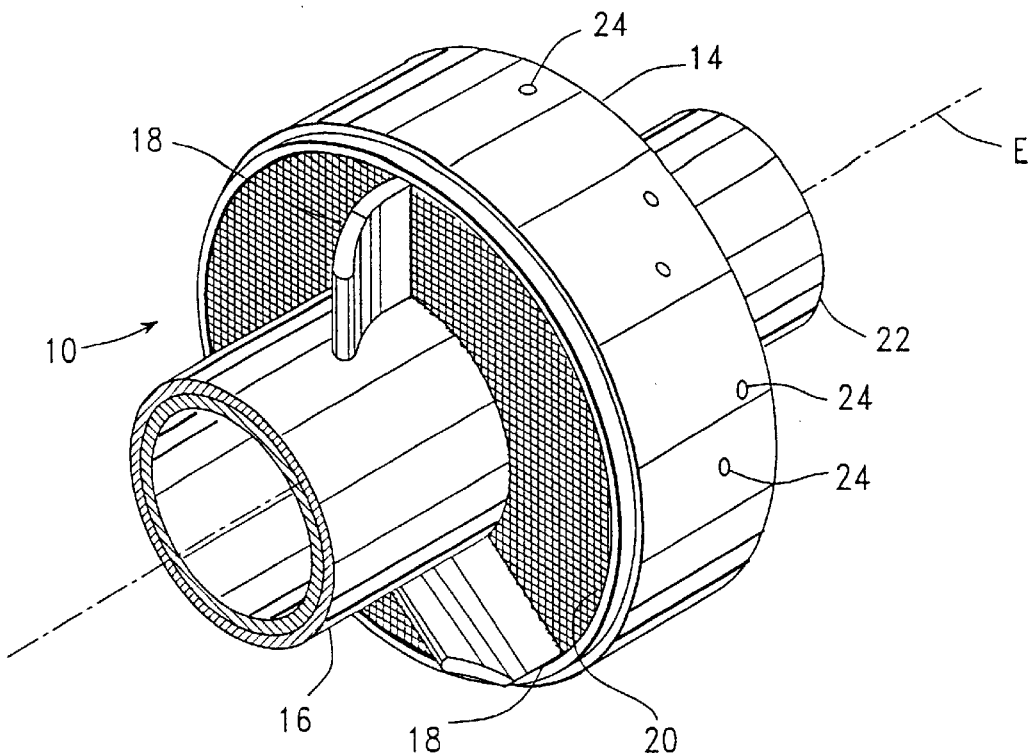
FIG. 1 is a perspective view of the deoiler with the three bladed cambered inducer and the variable housing for supporting the variable size porous material disks.
Figure 2:
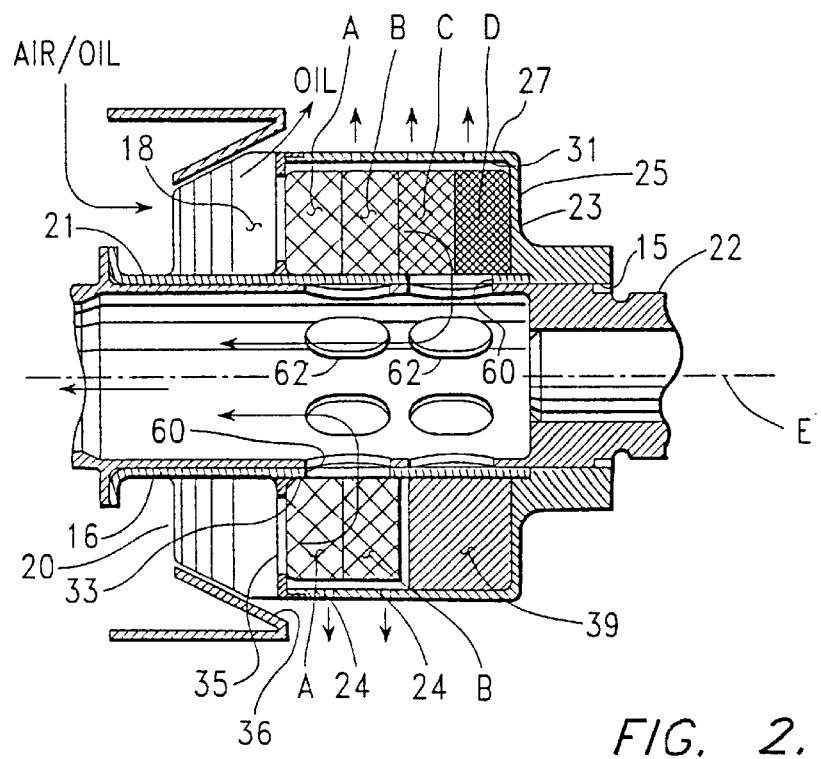
FIG. 2 is sectional view of the deoiler of FIG. 1 illustrating the details of the invention.
Figure 3:
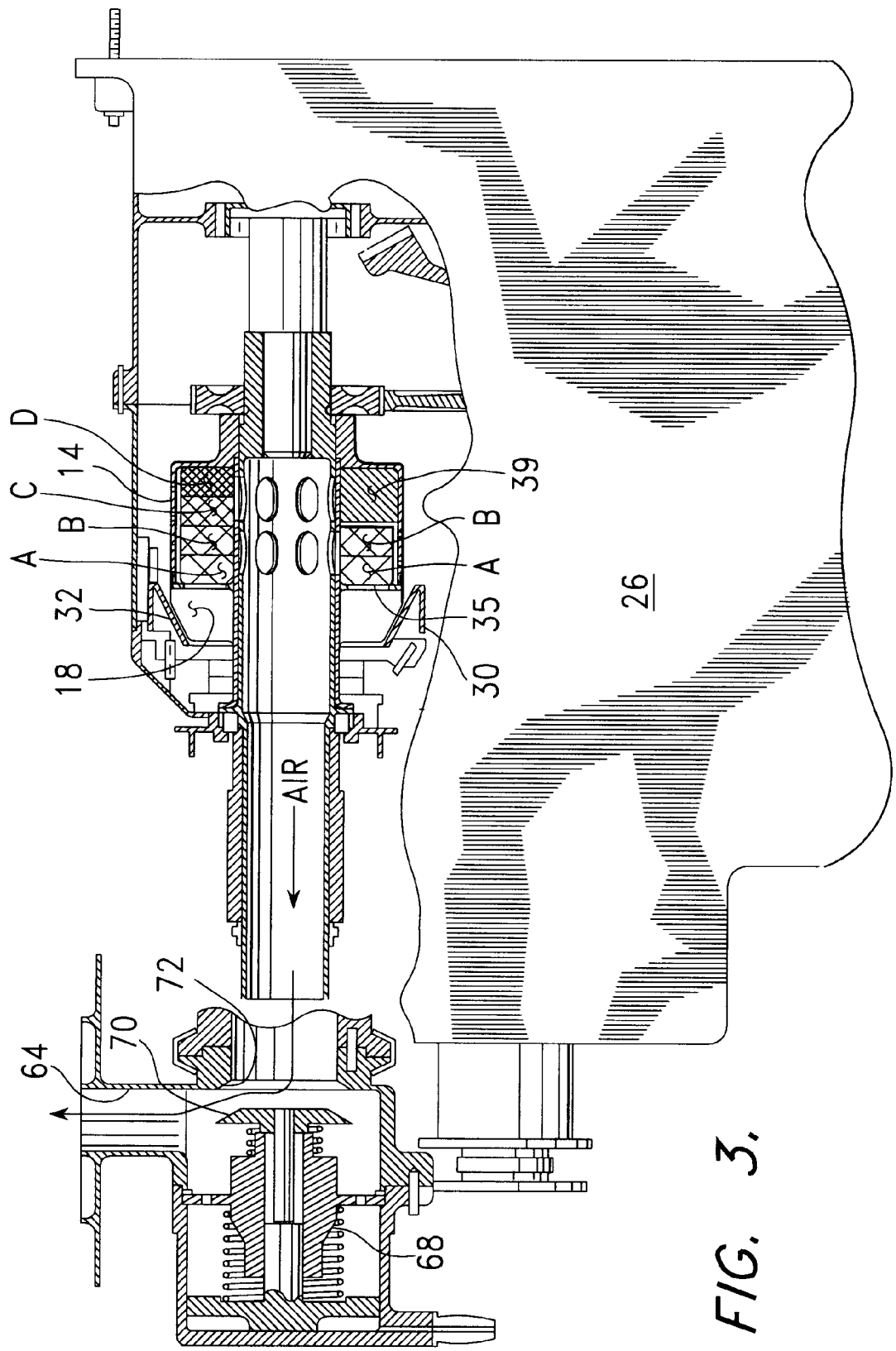
FIG. 3 is a cut away view partially showing the details of the gear box where this invention is being utilized.
Figure 4:
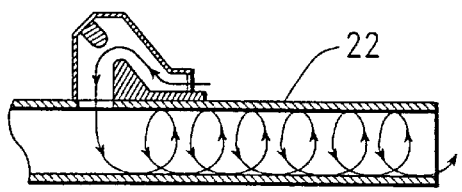
FIG. 4 is a prior art showing in schematic and section of the hollow shaft of the deoiler for illustrating the flow of the residue air of the air/oil mixture.

Referring next to FIGS. 1–3 and as described in the U.S. Pat. No. 5,114,446 patent, supra, the engine's gearbox is the ideal place in the turbine power plant to locate the deoiler because 1) the pressure in the gear box is lower than the pressure in the bearing compartment (not shown) and 2) the gearbox drives several shafts, one of which may be utilized for accommodating the deoiler. Obviously, the invention may be located in other locations in the engine just as other rotary machinery applications may find it desirable to utilize this invention so long as the shaft for removing the residue air is a rotating hollow shaft.

As noted in FIG. 1 which illustrates, in perspective, the deoiler generally indicated by reference numeral 10 comprises an outer housing 14 supported to shaft 22. As can be seen by looking into the forward end of the housing 14, the bladed rotor 16 mounted on shaft 22 ahead of housing 14 includes three equally circumferentially spaced inducer blades 18 which are cambered to accelerate the air/oil mixture as it flows into the inducer blade inlet 20 so as to cause the air/oil mixture to separate into its two components of air and oil. The RPM of the bladed rotor 16 driven by shaft 22 which rotates about axis E is relatively high for effective oil separation as will be described in more detail hereinbelow. The shaft 22 is ultimately driven by the engine's main shaft (not shown) via the gear box 26 (FIG. 3).

A plurality of discretely located circumferentially spaced oil discharge holes 24 are formed in housing 14 and discharge the oil that is separated out of the air/oil mixture by the inducer blades 16 and the porous media. The next portion of the description will describe the process of separating and removing the oil from the air/oil mixture for returning it to the lubrication system and gear boxes and discharging the residue air.

As can be seen in FIGS. 2 and 3, the air/oil mixture is radially admitted into the gear box 28 where it passes through the deoiler shroud 30 and flows tangentially toward the inlet 20 and then induced axially into the inlet by virtue of the rotating inducer blades 18. The vortex stream of the air/oil mixture impinges on the relatively high speed inducer blades where it is further rotated and pressurized causing the air/oil mixture to separate. The heavier droplets of oil (compared to the air) are centrifuged toward the outer periphery of the sloping wall 32 of shroud 30 which is generally W-shaped in cross section to migrate toward and ultimately be forced out of the deoiler through the annular spaced slots 36 and returned to the gear box 28. While in this particular application this action serves to remove the majority of the oil component, none-the-less, is a small quantity of oil remains in the stream. This air/oil mixture, however, contains smaller oil droplets which are not sufficiently heavy to be removed by the centrifugal action of the inducer and need to be removed. These minute droplets of oil are separated by and subsequently removed by the rotating porous media disks 40 as will be described in the next portion of this description.

As can best be seen in FIG. 2, housing 14 is annular in shape and includes a central bore 15 for accommodating the shaft 22 and the axial extension 21 of rotor 16. The housing 14 consists of the annular portion 23 defining the back wall 25, the outer annular wall 27 and the annular extension portion 29 for defining the cavity 31 for accommodating the porous media disks A, B, C, and D. The front wall 33 is affixed to the end of the annular wall 27 and defines the inlet 35. The porous media disks are toroidal shaped and are mounted on the sleeve portion 21 of the rotor 16 which is, in turn, mounted on shaft 22 to be rotated thereby. The disks are made from a wire mesh or sintered material and are sized to have different porosities to accommodate the size of the oil droplets. These disks are commercially available from Dunlop Aviation Division of Dunlop Limited of Coventry, England and can be purchased with varying grades. The cavity 31 in this embodiment is shown to accommodate as many as four different grades of disks. Each disks has a different density with the higher density disk increasing relative to the flow of the air/oil mixture. While this cavity can accommodate up to four disks depending on the thickness of each disk, it can be extended axially to accommodate ever more. For emphasis purposes, the drawing shows two full annular disks A and B and only the top half of disks C and D. Obviously, whenever a disk is removed a suitable spacer of suitable material is inserted in the vacant space.

As the flow proceeds from the inlet 35 and encounters the varying sized disks the oil droplets impact on the surface of the wire mesh of the porous media disks causing the minute particles to coalesce and then pumped outward by the centrifugal action of the rotating disks toward the outer wall until they migrate to the specially sized and discretely located discharge holes 24. The oil free air exits through the air discharge holes 60 formed in extension 21 and discharge holes 62 formed in the hollow shaft 22. The air flows toward the entrance end of the deoiler through shaft 22 where it is ultimately discharged through the overboard discharge port 64 by first passing through the pressure activated spring loaded breather valve 68. The breather valve is normally held closed by the spring by seating valve element 70 on seat 72 and only opens when the pressure in the hollow shaft overcomes the spring load on the valve element 70.

The porous disks elements A,B,C and D are sized and disposed in the increasing density relative to the flow not only to maximize the removal of the oil, but also to control pressure losses and reduce the overall pressure drop.

Figure 6:
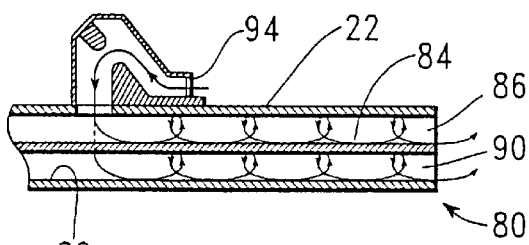
FIG. 6 is a schematic and sectional view of the improved hollow shaft with the baffle insert.
Figure 7:
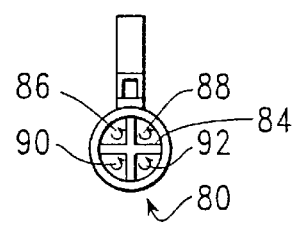
FIG. 7 is an end view of FIG. 6.
Figure 8:
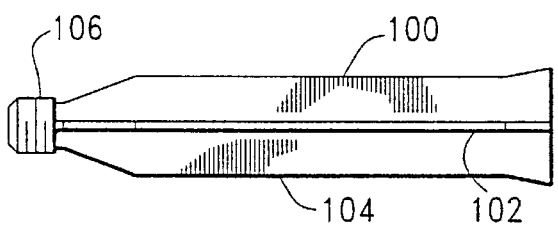
FIG. 8 is an elevated view of the baffle illustrating the details thereof.

In accordance with this invention and as illustrated in FIGS. 6–8 a baffle generally illustrated by reference numeral 80 is provided as an insert into hollow shaft 22 and serves to divide the stream of vortices into several streams of vortices. While the preferred embodiment of this invention is to retrofit existing deoiler systems, as one skilled in this art will appreciate the concept has utility in other systems and can be designed for original engines.

Figure 5:
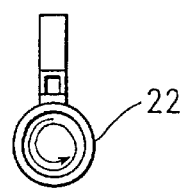
FIG. 5 is an end view of FIG. 4.

To best understand this invention, this portion of the description will describe the prior art system. Referring next to FIGS. 5 and 6, the prior art shaft is rotated at relatively high speeds and due to these high speeds and the internal geometry of the hollow shaft a significant pressure loss is evidenced primarily due to the high speed "free vortexing" effect imparted to the airflow. Free vortexing as used herein is the effect that swirling air has on itself in flowing through a cylindrically or conically shaped passageway. The swirling effect bootstraps itself and increases in vortex speed and results in increase pressure losses. In the deoiler system these pressure losses are manifested into a higher pressure drop of the system that ultimately can cause higher back pressure on the bearing compartment and force oil through its seals into an environment that could be harmful to the engine. In heretofore known designs of deoilers for turbine type power plants, the increased upstream pressure looses are compensated by increasing the bleed flow and increasing cooling requirements which results in a significant adverse impact on the overall weight of the system.

According to this invention the baffle 80 is an elongated flat plate whose width is dimensioned to extend to the inner surface of hollow shaft 22 through the longitudinal plane to divide the passage 82 into two passages. A pair of cross flat members 84 divides the two passages to another two to form four passages. These cross pieces also extend to the surface of the hollow shaft and divide the shaft into four separate elongated equally sized passageways 86, 88, 90 and 92. The cross pieces essentially are four rotating blades that extend the entire length of the shaft and rotate therewith and effectively reduce the effect of the free vortex and reduce the overall pressure losses. The flow from the deoiler as schematically shown enters the shaft through opening 94 and flows outwardly toward the right hand end as seen in these Figs. to ultimately be discharged. The flow stream enters the hollow shaft with a swirl component and the swirl velocity increases as it progresses downstream. The impact of the swirling air is lessened with the increase in the number of passages created.

Figure 9:
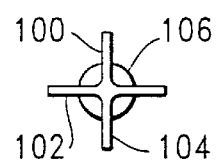

FIGS. 8 and 9 illustrate the actual geometry of the baffle designed to retrofit existing deoilers. In this embodiment four generally flat elongated plates 100, 102 104 and 106 are equally spaced around a circumference dimensioned to snugly fit into the passage of the hollow shaft. The forward end 106 is cylindrically shaped and threaded (left hand) to thread into threads formed on the inner diameter of the shaft. Obviously, this baffle slides into the hollow shaft and is threaded therein to be held and rotated thereby.

Figure 10:
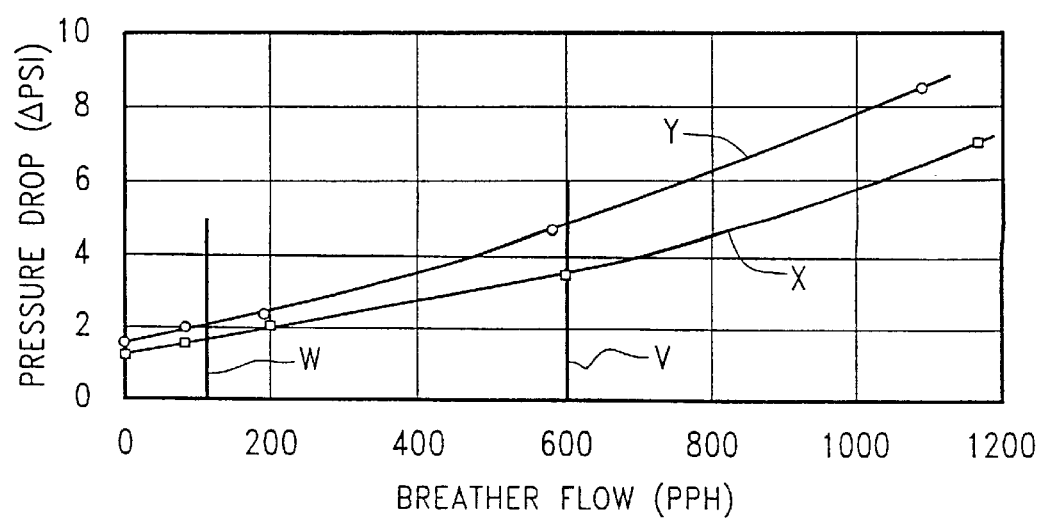
FIG. 10 is a graphical illustration comparing the prior art pressure losses with the pressure losses utilizing this invention.

FIG. 10 is a comparison of the hollow shaft with and without the baffle and illustrates the improvement in pressure losses over the entire operating envelope of the engine. The ordinate of the chart is a plot of the delta (Δ) pressure drop in pounds per square inch and the abscissa is a plot of the flow in the tube in pounds per hour (PPH) (breather flow). Curve X illustrates the results of actual tests with the baffle and curve Y illustrates the results of actual tests without the baffle. It can be observed at the vertical line W which is essentially when the engine is operating at low power (80 pph) there is an improvement of approximately one half of a psi and at mid-power engine operation, line V the pressure drop improvement increases to approximately 1.2 psi and the improvement continues as the engine operates at higher power of the engine operating envelope.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. In combination, a deoiler for separating and removing oil and air from an air/oil mixture, said deoiler comprising a rotatable hollow shaft, a rotatable inducer mounted on said hollow shaft, a rotatable porous media disk mounted on said hollow shaft and being disposed downstream from said rotatable inducer, a rotatable housing mounted on said shaft and rotatable therewith and defining a cavity for encapsulating said rotatable porous media disk for centrifuging the oil out of the air/mixture, an opening is said housing fluidly connecting said hollow shaft for flowing the air from said housing, said hollow shaft defining a passageway for flowing the centrifuged air axially through said hollow shaft, a baffle including a plate extending longitudinally in said hollow shaft and diametrically extending across said passageway for dividing said passageway into at least two parallel passages, whereby the pressure losses through said passageway is reduced.

2. The combination of claim 1 wherein said baffle includes a cross member extending from and intersecting said plate and being coextensive therewith and extending diametrically across said passageway to divide said passageway into four equal passages.

3. A deoiler for removing the air and oil from an air/oil mixture from a lubrication system contaminated in the bearing compartments and gear boxes of a gas turbine engine in combination with a vortex separator, said deoiler comprising a rotatable hollow shaft, a rotatable inducer mounted on said hollow shaft, a rotatable porous media disk mounted on said hollow shaft and being disposed downstream from said rotatable inducer, a rotatable housing mounted on said shaft and rotatable therewith and defining a cavity for encapsulating said rotatable porous media disk for centrifuging the oil out of the air/mixture, an opening in said housing fluidly connecting said hollow shaft for flowing the air from said housing, said hollow shaft defining a passageway for flowing the centrifuged air axially through said hollow shaft, said vortex separator including a baffle having a plate extending longitudinally in said hollow shaft and diametrically extending across said passageway for dividing said passageway into at least two parallel passages, whereby the pressure losses through said passageway is reduced.

4. A deoiler as claimed in claim 3 wherein said baffle includes a cross plate member extending from and intersecting said plate and being coextensive therewith and extending diametrically across said passageway to divide said passageway into four equal passages.

5. A deoiler as claimed in claim 3 wherein said baffle includes an annular portion formed on one end of said plate and threads formed on said annular portion for engaging complementary threads formed on the inner diameter of said hollow shaft, whereby said baffle is an insert capable of being installed into pre-existing hollow shafts.

6. A deoiler for removing the air and oil from an air/oil mixture from a lubrication system contaminated in the bearing compartments and gear boxes of a gas turbine engine in combination with a vortex separator, said deoiler comprising a rotatable hollow shaft, a rotatable inducer mounted on said hollow shaft and a fixed member having a generally W-shaped cross section and being disposed adjacent to said rotatable inducer and having a surface complementing the surface of said inducer for centrifuging out a portion of said oil of said oil/air mixture before said oil/air mixture enters said housing, a porous media disk means mounted on said hollow shaft and rotatable therewith and being disposed downstream from said rotatable inducer, a rotatable housing mounted on said shaft and rotatable therewith and defining a cavity for encapsulating said porous media disk means for centrifuging the remaining portion of the oil out of the air/mixture, an opening in said housing fluidly connecting said hollow shaft for flowing the air from said housing, said hollow shaft defining a passageway for flowing the centrifuged air axially through said hollow shaft, said vortex separator including a baffle having a plate extending longitudinally in said hollow shaft and diametrically extending across said passageway for dividing said passageway into at least two parallel passages, whereby the pressure losses through said passageway is reduced.

7. A deoiler as claimed in claim 3 wherein said baffle includes a cross plate member extending from and intersecting said plate and being coextensive therewith and extending diametrically across said passageway to divide said passageway into four equal passages.

8. A deoiler as claimed in claim 7 wherein said porous media disk means includes a plurality of disks mounted in side-by-side axially alignment.

9. A deoiler as claimed in claim 8 wherein the porosity of each of the porous media disk means decreases in the adjacent disks of said plurality of disks in a direction located downstream relative to the flow of said air/oil mixture.

10. A deoiler as claimed in claim 8 wherein said baffle includes an annular portion formed on one end of said plate and threads formed on said annular portion for engaging complementary threads formed on the inner diameter of said hollow shaft, whereby said baffle is an insert capable of being installed into pre-existing hollow shafts of the deoiler.

* * * * *